United States Patent
Lum et al.

(10) Patent No.: US 9,678,916 B2
(45) Date of Patent: Jun. 13, 2017

(54) METHOD AND APPARATUS FOR SIMPLIFYING COMMUNICATION BETWEEN A HOST SYSTEM AND A DISPLAY SUBSYSTEM

(71) Applicant: Apple Inc., Cupertino, CA (US)

(72) Inventors: David W. Lum, Cupertino, CA (US); Thomas J. Wilson, Falmouth, ME (US); Paolo Sacchetto, Cupertino, CA (US); Sandro H. Pintz, Menlo Park, CA (US); Fenghua Zheng, San Jose, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 14/500,944

(22) Filed: Sep. 29, 2014

(65) Prior Publication Data

US 2015/0199292 A1 Jul. 16, 2015

Related U.S. Application Data

(60) Provisional application No. 61/928,345, filed on Jan. 16, 2014.

(51) Int. Cl.
*G06F 13/36* (2006.01)
*G06F 13/42* (2006.01)

(52) U.S. Cl.
CPC .................. *G06F 13/4221* (2013.01)

(58) Field of Classification Search
None
See application file for complete search history.

(56) References Cited

U.S. PATENT DOCUMENTS

| 9,361,824 B2* | 6/2016 | Hsieh ................ G09G 3/2096 |
| 2015/0091837 A1* | 4/2015 | Srinivasan ............ G06F 3/0416 345/174 |

\* cited by examiner

*Primary Examiner* — Farley Abad
*Assistant Examiner* — Richard B Franklin
(74) *Attorney, Agent, or Firm* — Downey Brand LLP

(57) ABSTRACT

A method for simplifying the host-to-display subsystem communications and consolidating the non-volatile memory requirements into a PMIC (power management integrated circuit) is disclosed. Hardware and software resource reduction in both the client devices (located in the display subsystem) and the host System on a Chip (SOC) can be realized with a novel PMIC design. The novel PMIC design achieves the resource reduction by providing for the following features: (1) Single-point communication, (2) Single-point notification, (3) Client device status storage, (4) Client device initialization from PMIC non-volatile memory, and (5) Subsystem calibration retrieval from PMIC non-volatile memory.

20 Claims, 7 Drawing Sheets

METHOD AND APPARATUS FOR SIMPLIFYING COMMUNICATION BETWEEN A HOST SYSTEM AND A DISPLAY SUBSYSTEM

CROSS REFERENCE TO RELATED APPLICATION(S)

This application claims the benefit of prior U.S. Provisional Application No. 61/928,345, filed Jan. 16, 2014 and entitled "METHOD FOR DISPLAY SUBSYSTEM COMMUNICATION, INITIALIZATION, AND CALIBRATION STORAGE VIA POWER MANAGEMENT IC", which is incorporated by reference herein in its entirety for all purposes.

FIELD

The described embodiments relate generally to a method for display subsystem communications and non-volatile memory requirements associated with a power management integrated circuit (PMIC), and more particularly to a method for simplifying the host-to-display subsystem communications and consolidating the non-volatile memory requirements into a PMIC.

BACKGROUND

A typical display subsystem has multiple client devices. Each client device has a non-volatile memory and a complex protocol decoder. The client devices can be column driver outputs with timing controller (TCON) input (e.g., DisplayPort). The host System on a Chip (SOC) provides the video communication (e.g., DisplayPort AUX CH). The host System is connected directly to each client device and services multiple interrupts from multiple client devices.

Each client device uses the non-volatile memory to store the identical initialization contents. Additionally, a complex protocol decoder (e.g., DisplayPort AUX CH) is implemented within each client device. The SOC software (which can be any operating system) needs more processor time to handle the communication with each client device. Also, the SOC needs more time to service interrupts from the multiple client devices. The SOC requires another communication port (e.g., I2C) for power management integrated circuit (PMIC) adjustments. An additional non-volatile memory is needed to store the display subsystem calibration which adds another IC (integrated circuit) device to the display subsystem.

Therefore, it is desirable to have a method for simplifying the host-to-display subsystem communications and consolidating the non-volatile memory requirements into a PMIC.

SUMMARY

Methods and apparatus for simplifying communication between a host system and a display subsystem with multiple client devices are described. A power management integrated circuit provides a single point of communication between the host system and the display subsystem allowing the host system to communicate with multiple client devices over a single communication link. The power management integrated circuit includes: a protocol conversion bridge, a status manager, a volatile memory, and a non-volatile memory. The status manager sends a status check command for a client device to the protocol conversion bridge and the protocol conversion bridge queries the client device status registers and stores the status of the client device in a volatile memory within the power management integrated circuit. The status manager then sends a notification to the host system and the host system retrieves the status of the client device via the protocol conversion bridge using the single communication link. The power management integrated circuit provides a single-point communication and a single-point notification between the host system and the display subsystem.

This summary is provided merely for purposes of summarizing some example embodiments so as to provide a basic understanding of some aspects of the subject matter described herein. Accordingly, it will be appreciated that the above described features and embodiments are merely examples and should not be construed to narrow the scope or spirit of the subject matter in any way. Other embodiments, aspects, and advantages will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
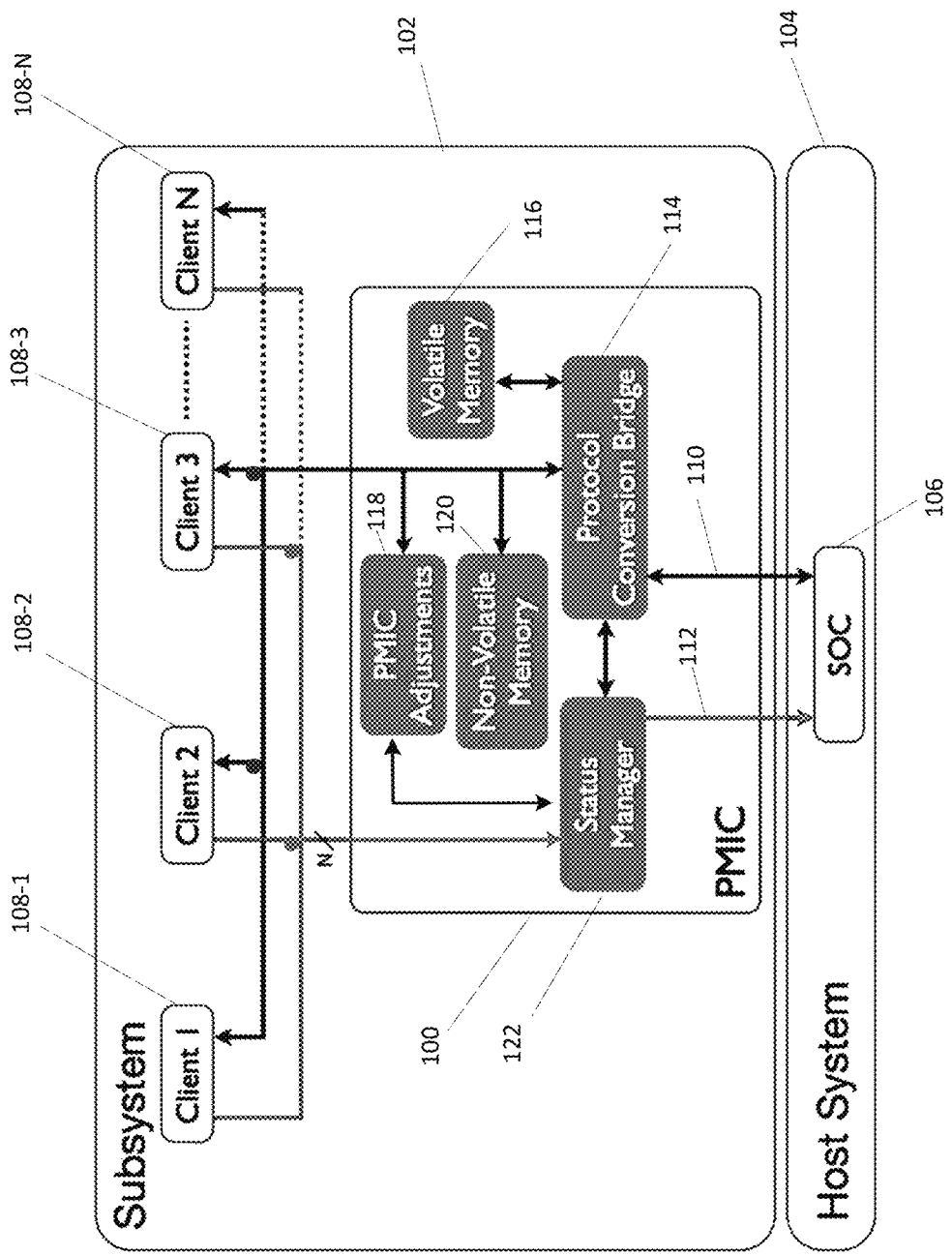
FIG. 1 shows a display subsystem with multiple client devices, which simplifies the host-to-display subsystem communications and consolidates the non-volatile memory requirements into a PMIC, in accordance with some example embodiments.

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

In a first embodiment, a controller is provided. The controller provides a single point of communication between a host system and a plurality of client devices. The controller includes: a first communication link and a second communication link that couples the controller and the host system; a protocol conversion bridge coupled to the plurality of the client devices and in communication with the host system over the first communication link; a status manager coupled to the plurality of client devices. The status manager communicates with the host system over the second communication link. In one embodiment, the status manager receives a notification trigger from a client device and sends a status check command for the client device to the protocol conversion bridge. The protocol conversion bridge queries the client device status registers and stores the client device status in a volatile memory within the controller. The host system receives a notification from the status manger and retrieves the client device status via the protocol conversion bridge. In one embodiment, the status manger sends the notification over the second communication link and the host system retrieves the client device status over the first communication link.

In a second embodiment, a method is provided. The method is performed by a controller for providing a single point of communication between a host system and a plurality of client devices. The method includes: providing a first client device information, by the controller, to the host system over a first communication link; and providing a second client device information, by the controller, to the host system over a second communication link. In one embodiment, the controller includes: a protocol conversion bridge coupled to the plurality of client devices providing the first client device information to the host system, and a status manger coupled to the protocol conversion bridge and the plurality of client devices providing the second client device information to the host system.

In a third embodiment, an apparatus is provided. The apparatus provides a single point of communication between a host system and a display subsystem including a plurality of client devices. The apparatus includes a protocol conversion bridge coupled to the plurality of client devices where the protocol conversion bridge communicates with the host system over a single communication link. The apparatus further includes a status manager coupled to the protocol conversion bridge where the status manger communicates with the host system by sending a single notification to the host system. In one embodiment the status managers sends a status check command for a client device to the protocol conversion bridge and the protocol conversion bridge queries the client device status registers and stores the client device status in a volatile memory. In another embodiment, the status manger sends a notification to the host system and the host system retrieves the client device status via the protocol conversion bridge. In some embodiments, the protocol conversion bridge includes a protocol bridge convertor output that supports broadcasting. In one embodiment, the plurality of client devices listen for a broadcast from the protocol bridge convertor output for synchronization.

In a fourth embodiment, a non-transitory machine-readable medium storing instructions for providing communication between a host system and a plurality of client devices using a controller is provided. The execution of the instructions by one or more processors within the controller causes the controller to at least: provide a first device information to the host system over a first communication link and provide a second device information to the host system over a second communication link. The host system communicates with multiple devices using the first communication link where the multiple devices include one or more of the plurality of client devices, a non-volatile memory, and a controller adjustments device. In one embodiment the status manager notifies the host system about a client device status using the second communication link, and the host system retrieves the client device status via the protocol conversion bridge using the first communication link.

In a fifth embodiment, an apparatus is provided. The apparatus provides a single point of communication between a host system and a plurality of client devices. The apparatus includes means for providing a first client device information, by the controller, to the host system over a first communication link; and means for providing a second client device information, by the controller, to the host system over a second communication link. In one embodiment, the controller includes: a protocol conversion bridge coupled to the plurality of client devices providing the first client device information to the host system, and a status manger coupled to the protocol conversion bridge and the plurality of client devices providing the second client device information to the host system. The status manager sends a status check command for a client device to the protocol conversion bridge and the protocol conversion queries the client device and stores the client device status in a volatile memory within the controller. In one embodiment, the host system receives a notification from the status manger over the second communication link and retrieves the client device status via the protocol conversion bridge over the first communication link.

In some embodiments, this disclosure describes a power management integrated circuit (PMIC) design with host-to-subsystem communications, client device initialization, and subsystem calibration storage. The PMIC design provides value arising from the hardware and software resource reduction in both the client devices (located in the display subsystem) and the host SOC (System on a Chip). In one embodiment, the client devices can have column driver output functionality with a timing controller (TCON) input. The software running on the SOC can be any operating system.

Accordingly, the described PMIC design allows the client devices to be less complex. This lower complexity saves cost for the overall system. Since the SOC software is less burdened by not communicating with each client device, power is saved and the user experiences a longer battery life. Moreover, the PMIC design can simplify the host-to-display subsystem communications and consolidating the non-volatile memory requirements into the PMIC.

An embodiment of the PMIC 100 is shown in FIG. 1. In particular, FIG. 1 shows a display subsystem 102 incorporates PMIC 100 coupled to host System 104 having SOC 106. In the described embodiment, PMIC 100 is also coupled with multiple client devices 108. It should be noted that the client devices can take many forms. For example, client device 108-1 can take the form of a first display device whereas client device 108-2 can take the form of a second display device. Accordingly, PMIC 100 acts as a single point of communication between host System 104 (including SOC 106) and any of client devices 108 which simplifies the host-to-display subsystem communications. Moreover, in accordance with some example embodiments, any non-volatile memory resources can be consolidated within PMIC 100.

In FIG. 1, the PMIC 100 includes a status manager 122, a protocol conversion bridge 114, PMIC adjustments 118, a non-volatile memory 120, and a volatile memory 116. The status manager 122 is the master device to the protocol conversion bridge 114. This arrangement allows the status manager 122 to update the client device status in the volatile memory 116 as described later.

It should be noted that the PMIC 100 can provide for at least the following features: (1) Single-point communication between SOC 106 and client device 108, (2) Single-point notification from the PMIC 100 to the SOC 106, (3) Client device status storage, (4) Client device initialization from PMIC non-volatile memory, and (5) Subsystem calibration retrieval from PMIC non-volatile memory.

In regards to the first feature of single-point communication, FIG. 1 shows single-point communication integrated within PMIC 100 configured between host System 104 and SOC 106 and a display subsystem 102 having multiple client devices 108. Accordingly, the SOC software is simplified since communications between SOC 106 and multiple client devices 108 are carried out through single communication channel 110. Accordingly, instead of requiring a more complex protocol receiver (e.g., DisplayPort AUX CH) repeated for each of the multiple client devices 108, each client device 108 can implement a simplified protocol receiver (e.g., I2C) thereby reducing overall IC gate count. Consequently, a more complex receiver is implemented only once at PMIC 100.

In regards to the second feature of single-point notification, FIG. 1 shows that the notification method is integrated within PMIC 100 from multiple client devices 108 to result in a single notification link 112 to the host System 104 to simplify software implementation.

In regards to the third feature of client device status storage, FIG. 1 shows that the client device status is stored within PMIC 100 using volatile memory 116 for read-back by the host System 104 after receiving notification from PMIC 100. After receiving notification, the host System 104 then retrieves the client device status via a protocol conversion bridge 114.

In regards to the fourth feature of client device initialization, FIG. 1 shows that client device initialization content is stored within PMIC 100 using non-volatile memory 120 to reduce repetition of the same initialization contents per client device.

In regards to the fifth feature of subsystem calibration retrieval, FIG. 1 shows that subsystem calibration (e.g., optical calibration) is stored within PMIC 100 using non-volatile memory 120. The host System 104 retrieves the subsystem calibration via the protocol conversion bridge 114. The PMIC design shown in FIG. 1 can provide for various benefits and goals, which are described below.

Using PMIC as a single point of communication between the host System and multiple client devices benefits the SOC software by allowing SOC and the host System to communicate with multiple client devices through the PMIC instead of direct communication with each of the multiple client devices individually which requires more processor power. This also benefits the multiple client devices since they can implement a simpler protocol decoder instead of a more complex standard. The consequence is an overall display subsystem cost savings.

Additionally, using PMIC as a single-point notification benefits the SOC software. This method relieves the burden on the SOC software to service each client device notification in order to save processor power.

Since the multiple client devices store the same initialization settings, the client devices benefit from moving the initialization storage from within each of the multiple client devices to the PMIC. The consequence is an overall display subsystem cost savings.

Using non-volatile memory in the PMIC for multiple purposes, such as storing the display subsystem calibration, benefits the display subsystem by reducing the cost of an EEPROM and the PCB (printed circuit board) area it requires.

Figure 2:
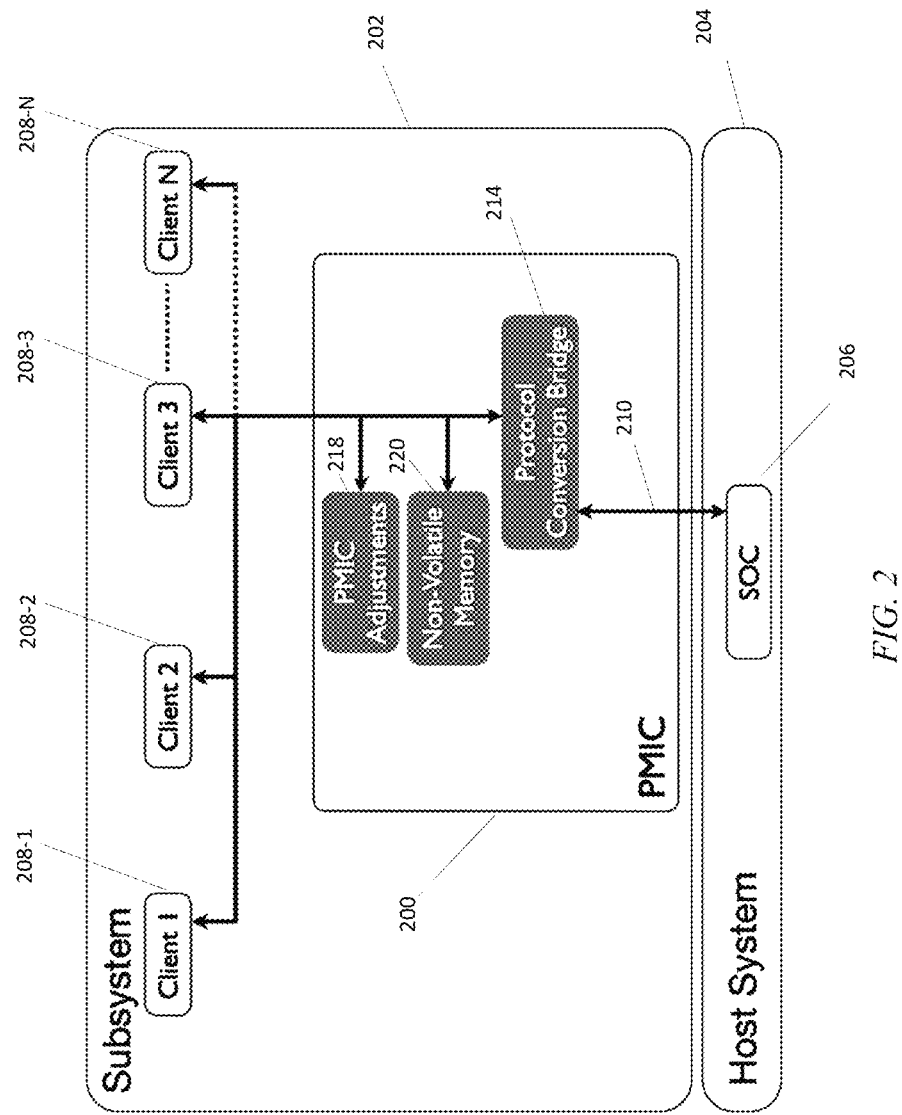
FIG. 2 shows a display subsystem with multiple client devices, which features single-point communication via a PMIC, in accordance with some example embodiments.

FIG. 2 shows a display subsystem 202 including multiple client devices 208 and PMIC 200. The PMIC 200 is coupled to a host System 204 having SOC 206 and multiple client devices 208. The PMIC 200 acts as a single point of communication between the host System 204 and multiple client devices 208. In accordance to some example embodiment, the single-point communication can be provided by a protocol conversion bridge 214 within PMIC 200. The protocol conversion bridge 214 allows the host System 204 to communicate with each of the multiple client devices 208 using a single communication link 210. The host System 204 retrieves a client device status through the protocol conversion bridge 214 within PMIC 200 using the single communication link 210.

Accordingly, single-point communication between the host System 204 and multiple client devices 208 using PMIC 200 benefits the SOC 206 software (e.g., any operating system), because the SOC 206 software is less burdened by not having to communicate with each client device 208 directly. The protocol conversion bridge 214 is integrated into the PMIC 200, as shown in FIG. 2, providing a single communications link 210 to the SOC 206. The protocol conversion bridge 214 can be the AUX CH-to-I2C method as described in the DisplayPort standard. The protocol conversion bridge 214 allows SOC 206 to communicate with multiple devices such as multiple client devices 208, non-volatile memory 220, and PMIC adjustments 218 using a single communication link 210 (e.g., AUX CH). The PMIC adjustments 218 include one or more of the PMIC voltage rail settings, power on/off timing, p-Gamma settings, p-VCOM calibration, etc. In one embodiment, these settings can be stored in the non-volatile memory 220 as shown in FIG. 2. In another embodiment, these settings can be stored in a separate non-volatile memory.

The protocol conversion bridge 214 includes a protocol bridge convertor output that supports broadcasting. Multiple client devices 208 listen for this broadcast to synchronize their behavior (e.g., common clocking frequency).

Single-point communication also benefits the multiple client devices 208 by allowing each of the multiple client devices to implement a simpler protocol decoder (I2C) instead of a more complex standard (AUX CH). As such, the AUX CH decoding is done only at the PMIC 200 to reduce duplication and cost.

Figure 3:
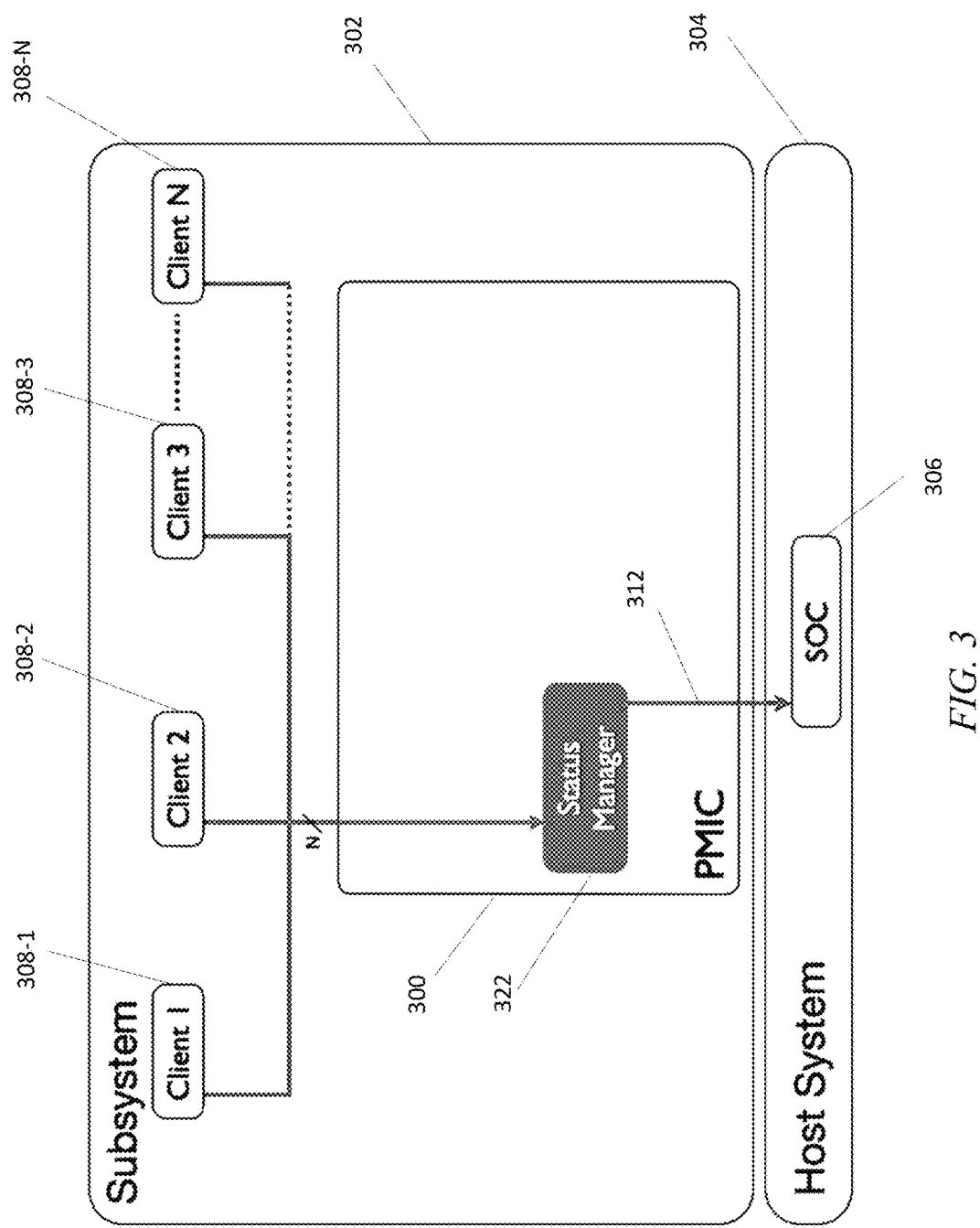
FIG. 3 shows a display subsystem with multiple client devices, which features single-point notification via a PMIC, in accordance with some example embodiments.

FIG. 3 shows a display subsystem 302 including multiple client devices 308 and PMIC 300. The PMIC 300 provides a single-point notification between the multiple client devices 308 and host System 304 having SOC 306. In accordance with some example embodiments, the PMIC includes a status manger 322. The status manger 322 sends a notification to the host System 304 through a single notification link 312 informing the host System 304 about a client device status. This is described in more detail in FIG. 4.

Accordingly, single-point notification between PMIC 300 and the host System 304 benefits the SOC software. The status manager 322 handles the multiple notifications from the multiple client devices 308 as shown in FIG. 3. The status manager 322 distinguishes between each client device 308 interrupts and status changes. After the status if a client device is updated in the volatile memory, the status manager 322 notifies the host System 304 by sending a single signal notification (e.g., DisplayPort HPD) to the host System 304 and SOC 306. This method relieves the burden on the SOC software to service each client device notification.

Each client device 308 asserts its interrupt line (e.g., LOW to HIGH) after it powers up. The client device 308 then sends interrupt pulses (e.g., negative-edge pulses) to indicate link establishment stages, symbol errors, column driver problems, etc.

Figure 4:
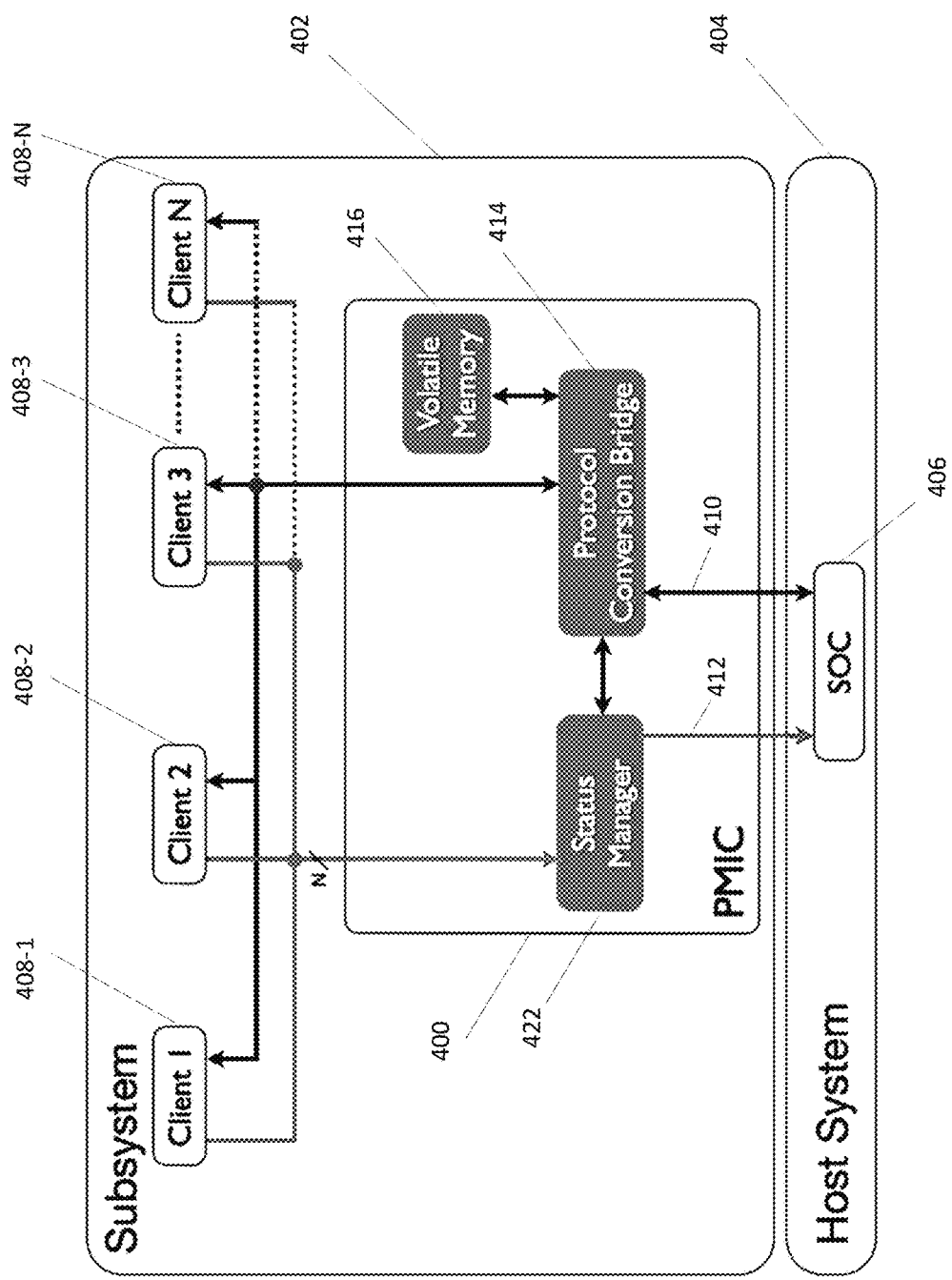
FIG. 4 shows a display subsystem with multiple client devices, which features client device status storage in a PMIC, in accordance with some example embodiments.

FIG. 4 shows a display subsystem 402 with multiple client devices 408 and PMIC 400. In accordance with some example embodiments, the PMIC includes a status manger 422, a protocol conversion bridge 414, and a volatile memory 416. The status manger 422 is the master of the protocol conversion bridge 414. In particular, FIG. 4 shows PMIC 400 provides a client device status to the host System 404 and SOC 406 using a single communication link 410 after sending a notification to the host System 404 using a single notification link 412.

The status manager 422 receives interrupts from multiple client devices 408. A client device 408 notification triggers the status manager 422. After receiving an interrupt from a client device 408, the status manager 422 queries the client device status and saves it into a volatile memory 416, as shown in FIG. 4. The status manager 422 then sends a status check command for the appropriate client device 408 to the protocol conversion bridge 414. Subsequently, the protocol conversion bridge 414 queries the client device status registers. The protocol conversion bridge 414 saves the client device status in the volatile memory 416 provided within the PMIC 400. The status manager 422 then informs the host System 404 and SOC 406 by sending a single-point notification. The status manager notifies the host System 404 about the client device status change using a single notification link 412. The host System 404 then queries the protocol conversion bridge 414 about the client device status. (e.g., DPCD register). The host System 404 retrieves the client device status through the protocol conversion bridge 414 using a single communication link 410.

In one embodiment, the client device 408 can be a column driver output function with an integrated TCON input function (e.g., DisplayPort). Each of the multiple client devices 408 must send interrupts to the status manager 422 as the link establishment changes (e.g., Main Link clock lock, phase lock, lane alignment, symbol errors, etc.).

Figure 5:
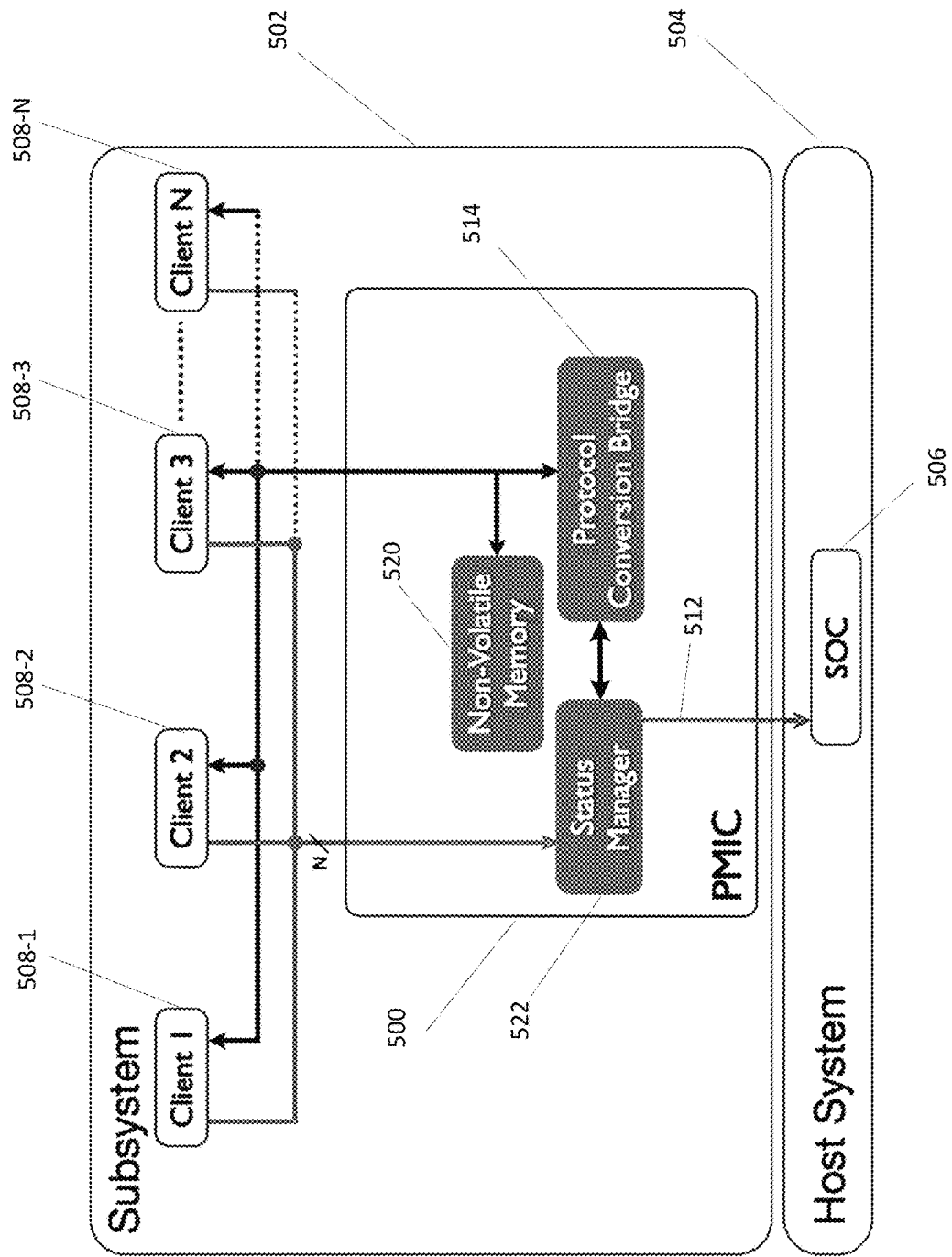
FIG. 5 shows a display subsystem with multiple client devices, which features client device initialization from PMIC non-volatile memory, in accordance with some example embodiments.

FIG. 5 shows a display subsystem 502 including multiple client devices 508 and PMIC 500. In accordance to some example embodiments, the PMIC 500 uses at least a non-volatile memory 520, a protocol conversion bridge 514, and a status manger 522 for client device initialization.

The multiple client devices 508 store the same initialization settings. Implementing the non-volatile memory 520 within PMIC 500 allows each of the multiple client devices 508 to store the client device initialization in the storage provided within the PMIC 500. Each of the multiple client devices 508 stores the same initialization content within the PMIC 500. Accordingly, the overall system benefits by storing the initialization content once in the non-volatile memory 520 provided within the PMIC 500.

After all client devices 508 assert their interrupt lines to indicate power on, the protocol conversion bridge 514 first initializes client device 508-1. The protocol conversion bridge then initializes client device 508-2, at a different (e.g., I2C) device address. The process is repeated until all client devices are initialized.

Figure 6:
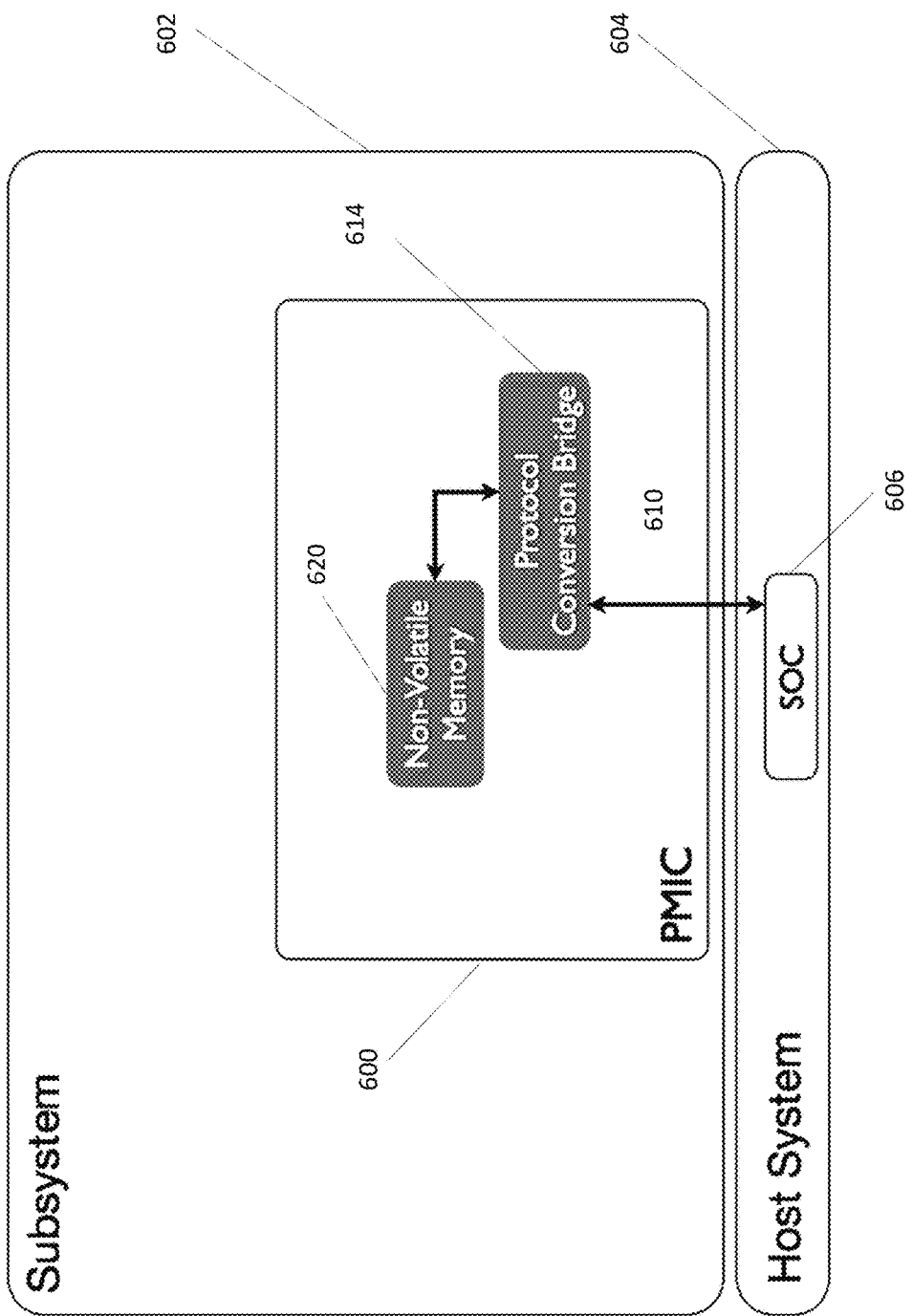
FIG. 6 shows a display subsystem with multiple client devices, which features subsystem calibration retrieval from PMIC non-volatile memory, in accordance with some example embodiments.

FIG. 6 shows a display subsystem 602 including PMIC 600 which features subsystem calibration retrieval from a non-volatile memory 620 implemented within the PMIC 600 by a host System 604. In accordance with some example embodiments, the host System 604 can retrieve the display subsystem 602 calibration from PMIC 600 using the non-volatile memory 620. The host System 604 retrieves the subsystem calibration via the protocol conversion bridge 614 within the PMIC 600.

Using non-volatile memory in the PMIC for multiple purposes benefits the display subsystem. In other words, the display subsystem does not need a separate external EEPROM (Electrically Erasable Programmable Read-Only Memory), or other non-volatile memory. The SOC can retrieve subsystem calibration (e.g., white-point correction) via the protocol conversion bridge as shown in FIG. 6.

Figure 7:
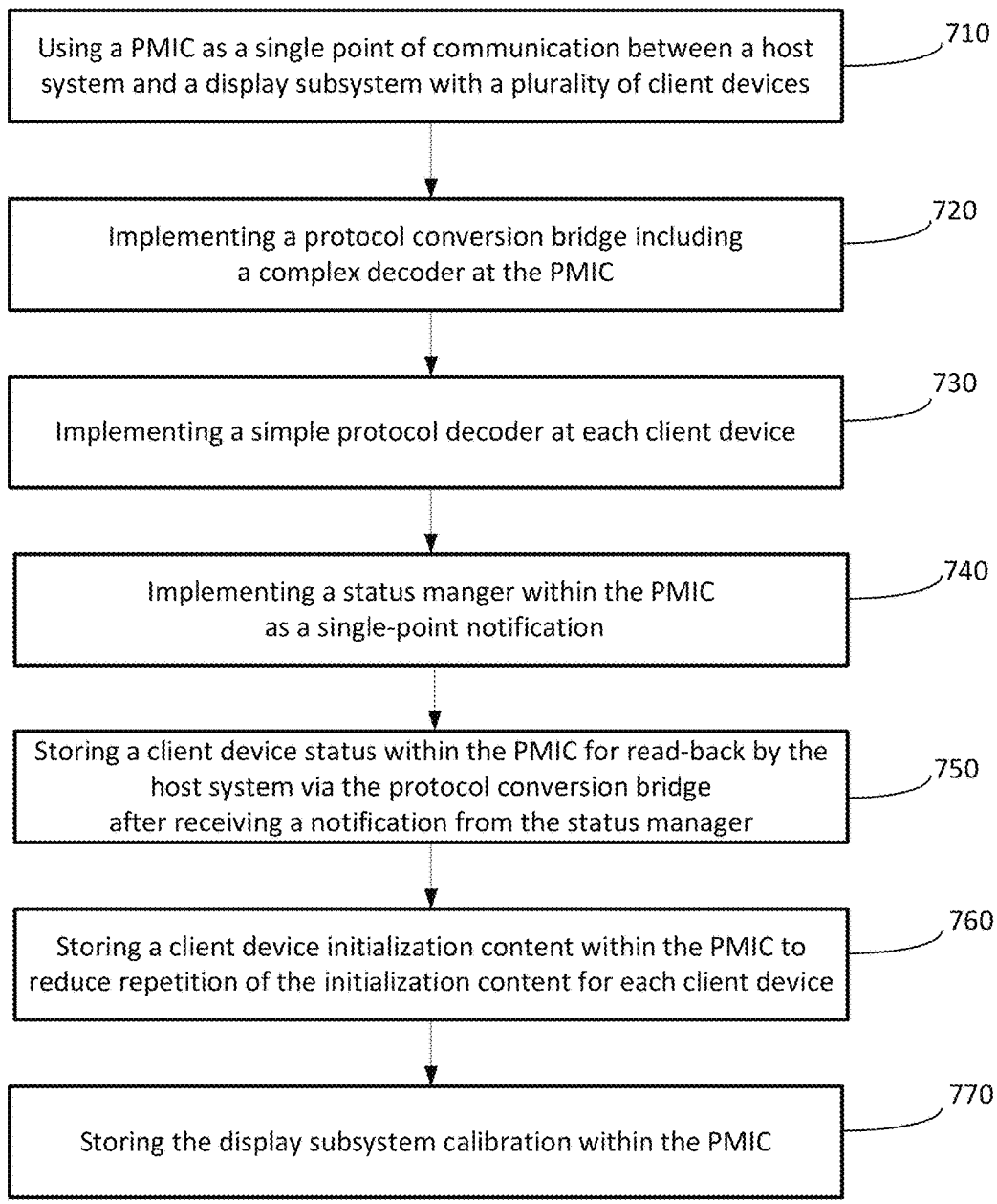
FIG. 7 shows a flowchart according to an example method for simplifying communication between a host system and a display subsystem with multiple client devices, in accordance with some example embodiments.

FIG. 7 shows a flowchart according to an example method for simplifying communication between a host system and a display subsystem with multiple client devices, in accordance with some example embodiments. Operation 710 can include using a PMIC as a single point of communication between the host system and the display subsystem with a plurality of client devices. In one embodiment, using PMIC as a single point of communication between the host system and the plurality of client devices allows hardware and software resource reduction in both the host system and the plurality of client devices. Operation 720 can include implementing a protocol conversion bridge with a complex decoder within the PMIC. The protocol conversion bridge is coupled to the plurality of client devices and provides a client device status to the host system over a single communication link. Using a complex decoder within the PMIC allows complex decoding to be done by the protocol conversion bridge instead of each client device. Operation 730 can include implementing a simple protocol decoder at each client device where complex decoding is done by the protocol conversion bridge within the PMIC. Operation 740 can include implementing a status manger within the PMIC as a single-point notification. The status manager sends a status check command for a client device to the protocol conversion bridge. The protocol conversion bridge queries the client device status registers and stores the client device status in a volatile memory within the PMIC. Operation 750 can include storing the client device status in the volatile memory within the PMIC for read-back by the host system via the protocol conversion bridge after receiving a notification from the status manager. The status manager sends a notification to the host system and the host system retrieves the client device status via the protocol conversion bridge using the single communication link. Operation 760 can include storing a client device initialization content within the PMIC using a non-volatile memory to reduce repetition of the same initialization content for each client device. Operation 770 can include storing the display subsystem calibration within the PMIC using the non-volatile memory.

The host system can retrieve the display subsystem calibration via the protocol conversion bridge.

The various aspects, embodiments, implementations or features of the described embodiments can be used separately or in any combination. Various aspects of the described embodiments can be implemented by software, hardware or a combination of hardware and software. Some of the described embodiments can also be embodied as computer readable code on a non-transitory computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A controller configured as a single point of communication between a host system and a plurality of client devices, comprising:
   a first communication link that couples the controller and the host system over which a first set of client device information is provided to the host system;
   a second communication link that couples the controller and the host system over which a second set of client device information is provided to the host system;
   a protocol conversion bridge coupled to the plurality of client devices and arranged to communicate with the host system over the first communication link; and
   a status manager coupled to the plurality of client devices and arranged to communicate with the host system over the second communication link and in communication with the protocol conversion bridge.

2. The controller as recited in claim 1, wherein the protocol conversion bridge provides the first set of client device information to the host system.

3. The controller as recited in claim 1, wherein the status manager provides the second set of client device information to the host system.

4. The controller as recited in claim 1, wherein the status manager receives a notification trigger from a client device and sends a status check command for the client device to the protocol conversion bridge.

5. The controller as recited in claim 4, wherein the protocol conversion bridge queries a client device status registers and stores a client device status in a volatile memory within the controller.

6. The controller as recited in claim 5, wherein the status manager informs the host system about the client device status by sending the second set of client device information to the host system.

7. The controller as recited in claim 5, wherein the first set of client device information is the client device status.

8. The controller as recited in claim 1, wherein each client device comprises a display column driver.

9. A method performed by a controller for providing communication between a host system and a plurality of client devices, the method comprising:
   providing a first client device information by the controller to the host system using a first communication link;
   providing a second client device information by the controller to the host system using a second communication link that is different than the first communication link;
   using a protocol conversion bridge to provide the first client device information to the host system over the first communication link, wherein the protocol conversion bridge is coupled to the plurality of client devices;
   using a status manager to provide the second client device information to the host system over the second communication link, wherein the status manager is coupled to the protocol conversion bridge and is in communication with the plurality of client devices.

10. The method as recited in claim 9, further comprising storing a client device status in a volatile memory by the protocol conversion bridge.

11. The method as recited in claim 10, wherein the host retrieves the client device status via the protocol conversion bridge using the first communication link, and wherein the client device status is the first client device information.

12. The method as recited in claim 9, wherein each client device comprises a display column driver.

13. An apparatus configured as a single point of communication between a host system and a plurality of client devices, the apparatus comprises:
   a protocol conversion bridge coupled to the plurality of client devices and configured to communicate with the host system using a single communication link, wherein the protocol conversion bridge provides a status of a particular client device to the host system over the single communication link;
   a status manager coupled to the protocol conversion bridge and in communication with the host system, wherein the status manager is configured to send a status check command for the particular client device to the protocol conversion bridge;
   a volatile memory, wherein the protocol conversion bridge stores the status of the particular client device in the volatile memory; and
   a non-volatile memory, wherein the plurality of client devices store a client device initialization in the non-volatile memory.

14. The apparatus of claim 13, wherein the protocol conversion bridge further queries a particular client device status registers and stores the status of the particular client device in the volatile memory, and wherein the status manager informs the host system about the status of the particular client device by sending a notification to the host system.

15. The apparatus of claim 13, wherein the protocol conversion bridge benefits a host system software by allowing the host system to communicate with the plurality of client devices via the protocol conversion bridge.

16. The apparatus of claim 13, wherein a complex decoding is done by the protocol conversion bridge allowing each client device to use a simple protocol decoder.

17. The apparatus of claim 13, wherein the protocol conversion bridge includes a protocol bridge convertor output that supports broadcasting, and wherein the plurality of client devices listen for a broadcast from the protocol bridge convertor output for synchronization.

18. A non-transitory machine-readable medium storing one or more sequences of instructions for providing communication between a host system and a plurality of client devices using a controller, wherein execution of the one or more sequences of instructions by one or more processors contained in the controller causes the controller to at least:

provide a first client device information to the host system using a first communication link; and provide a second client device information to the host system using a second communication link that is different than the first communication link, wherein the host system communicates with multiple devices via a protocol conversion bridge using the first communication link, and wherein the multiple devices comprises one or more of the plurality of client devices, a non-volatile memory, and a controller adjustments device; and wherein a status manager notifies the host system about a client device status using the second communication link, and wherein the host system retrieves the client device status via the protocol conversion bridge using the first communication link.

19. The non-transitory machine-readable medium recited in claim 18, wherein each client device comprises a display column driver.

20. The non-transitory machine-readable medium recited in claim 18, wherein the execution of the one or more sequences of instructions by the one or more processors contained in the controller further causes the controller to at least use the protocol conversion bridge to provide a common clocking frequency to the plurality of client devices.

* * * * *